Patented Apr. 27, 1937

2,078,830

UNITED STATES PATENT OFFICE 2,078,830

MANUFACTURE OF ABRASIVE ARTICLES

Raymond C. Benner, Niagara Falls, Osborne L. Mahlman, Kenmore, and Walter D. Rossow, Niagara Falls, N. Y., assignors, by mesne assignments, to The Carborundum Company, Niagara Falls, N. Y., a corporation of Delaware No Drawing. Application December 6, 1934, Serial No. 756,329. In Canada June 20, 1932

11 Claims. (Cl. 51—280)

This invention relates to the manufacture of abrasive articles and particularly to the manufacture of organic bonded abrasive articles having differing preselected grinding characteristics. This application is a continuation-in-part of prior application, Serial No. 553,887, filed July 29, 1931.

In the manufacture of both organic and ceramic bonded abrasive articles it is customary to produce articles having differing grinding characteristics by using differing proportions of bond to abrasive grain in the articles. While this method furnishes a means for securing differing characteristics in the grinding action of the bonded articles, it is somewhat limited in scope because the difference obtained by this means is always accompanied by changes in other properties, such as strength and particularly in the resistance to rupture from centrifugal force. Furthermore in order to obtain the so-called soft grinding article it is necessary to reduce the quantity of bond to such an extent that the articles are materially weakened.

In the manufacture of ceramic bonded abrasive articles a further variation in grinding action beyond that obtained by changing the proportion of bond to grain is secured by altering the composition of the bond. Previously there has been no equivalent method of securing in organic bonded abrasives the variability in grinding action which is common with ceramic bonded articles. The kinds of synthetic resins available which are suitable for bonding abrasives are more or less limited and although there is some difference between abrasives bonded with these different resins the difference is limited as compared with that obtained with ceramic bonding compositions. This lack of variability in the action of resin bonded abrasives has materially limited the field in which such articles can be used.

We have discovered that the grinding action of resin bonded abrasives varies with the coefficient of expansion of the bond; and by bond is meant all of the finished article except the abrasive grain proper. We have further discovered that this variability is distinct from that secured by the previously available method of varying the proportion of bond to grain.

These phenomena appear to be due to certain factors which we will now discuss by way of clarifying the understanding of the invention, without intending however, to limit the invention by the theory. During a grinding operation the abrasive grains in contact with the work, because of that contact, become dulled, and if the abrasive article is to continue to cut efficiently the dulled grain must be removed. Provision for this removal has been made in the past by so proportioning the bond to grain that the excess pressure built up between the abrasive article, for example a wheel, and the work caused by the failure of the dulled grain to remove the expected amount of material is sufficient to rupture the bond, thus breaking out the dull grain and exposing fresh sharp grains at the surface of the wheel.

When a dull grain is repeatedly rubbed over a piece of work under the pressure of the grinding action the friction between the two surfaces results in local heating as a result of which the adhesion between the bond and the grain is affected by the relative thermal expansion of the bond and grain. This differential thermal expansion of the bond and grain causes local stresses between the bond and grain which help to free the grain from the bond. These stresses in conjunction with the pressure between grain and work result in rupturing the grain-bond adhesion and breaking the grain loose.

Since the forces which break the grain from the bond include from that of differential expansion of the grain and bond as well as the shock of the contact of the grains with the work, it is possible to vary the tenacity of bond to grain over a greater range than that feasible where rupture depends upon pressure alone. For example, by selectively varying the coefficient of expansion of the organic bond, we are able to amplify the force resulting from differential expansion between grain and bond to assist the breakdown of the wheel or the differential expansion can be reduced to a minimum thereby strengthening the wheel against the breakdown ordinarily due to local heating.

The present invention provides for varying the coefficient of expansion of the cured organic bond, for example resin, in the finished article with reference to the thermal coefficient of expansion of the abrasive grain by adding to the resin used in the mix for making the article a comminuted material having a relatively low thermal coefficient of expansion.

The coefficient of expansion of a resin bond material may be lowered with advantage by the addition of comminuted materials having a thermal coefficient of expansion lower than that of the abrasive grain used. This procedure is particularly advantageous as it reduces to a minimum the modifier necessary to add to the resin to vary its coefficient of expansion with respect to that of the abrasive grain.

Materials which have been found useful in comminuted form as modifiers of the resin bond are fused quartz, silicon carbide and certain devitrified silicates of metals of the second group of the periodic system of the chemical elements as set up by Mendeléeff's law, such as magnesium aluminosilicate.

The modifier may be added to the mix in any convenient manner to provide intimate mixture with the resin when cured. For example, when the grain is wetted with a plasticizer such as furfural and powdered potentially reactive resin is mixed with the wetted grain, the comminuted modifier which may comprise a plurality of the substances mentioned above, may be intimately mixed with the dry resin previous to its addition to the mix.

For example, a pressed cured mixture of 400 grams of dry powdered phenol formaldehyde resin and 50 cc. of furfural had a coefficient of expansion of $39.22 \times 10^{-6}/°$ C. Aluminum oxide abrasive grain has a thermal coefficient of expansion of $5.94 \times 10^{-6}$ at $20°$–$90°$ C.

Replacing 40 grams of the resin with 106 grams of pulverized fused silica and pressing and curing the mixture under the same conditions produced a piece having a coefficient of expansion of $32.72 \times 10^{-6}/°$ C.

Replacing 100 grams of the original mix with 265 grams of fused silica as above and pressing and curing under the same conditions produced a piece having a coefficient of expansion of $24.7 \times 10^{-6}/°$ C.

When fused alumina or other abrasive having an equal or greater coefficient of expansion is used it is convenient to use a modifier comprising pulverized silicon carbide. For example, when 40 grams of the dry resin of the original mix set forth above were replaced with 125 grams of pulverized silicon carbide and the mix pressed and cured under the same conditions as in the other examples, the piece was found to have a coefficient of expansion of $31.62 \times 10^{-6}/°$ C. a reduction of 7½ points.

When 100 grams of the original 400 grams of dry powdered resin of the original mix were replaced with 312 grams of pulverized silicon carbide it was found that the coefficient of expansion of the pressed and cured article had been reduced to $24.12 \times 10^{-6}/°$ C.

Certain devitrified silicates of the metals of the second group of the periodic system are particularly useful in connection with this invention because of their relatively low thermal coefficient of expansion. These include magnesium alumino-silicate, zinc orthosilicate, barium alumino-silicate, beryllium alumino-silicate and calcium alumino-silicate. Of these the magnesium alumino-silicate is particularly useful because of its extremely low coefficient of expansion and the ease with which it may be prepared. Its coefficient of expansion is of the order of magnitude of that of fused silica and may approach zero depending upon the presence or absence of certain impurities.

The substitution of 106 grams of this magnesium alumino-silicate for 40 grams of the dry powdered resin of the original example produced, when the mix was pressed and cured properly, an article having a coefficient of expansion of $28.62 \times 10^{-6}/°$ C. An increase of the amount of modifier to 265 grams of a corresponding decrease of the dry resin to 300 grams under these same conditions produced an article having a thermal coefficient of expansion of $24.62 \times 10^{-6}/°$ C.

It is to be understood that the foregoing examples are given merely to illustrate the effect of the addition of these modifiers to the resin on the thermal coefficient of expansion of the bond as compared with that of the grain. It will be apparent that changes in the specific composition, for example as to the resin bond used or the plasticizer used, or the proportions of the plasticizer, resin and modifier, will give substantially any value of coefficient of bond expansion which may be desired within reason. Furthermore, the modifiers mentioned above are merely illustrative of a class of materials having the required low coefficients of expansion and which can be intimately mixed with resin in the curing thereof without adversely affecting the bond chemically.

It is customary to make abrasive articles in series of grades, the grades depending in previous practice, primarily upon the proportion of the bond to grain in the article. By means of the present invention we are able to establish a similar set of articles made according to our invention with the added feature that we are able to make several series of articles, the grades of any series being produced as usual by changing the bond content. In this way we can systematically cover a very broad range of grinding characteristics, such as are now covered, much more narrowly by variation in proportion of bond to grain. Thus we have broadened the range of resin bonded abrasive to include several series as well as the one series now in common use.

We claim:

1. An improvement in the method of producing abrasive articles of desired grinding characteristics from a mixture of abrasive grain and resin-containing bond which comprises mixing abrasive grain and resin modified by the addition of a comminuted substance having a coefficient of expansion less than $5.0 \times 10^{-6}/°$ C. at $20$–$90°$ C. and lower than that of the said abrasive grain and controlling the extent to which the coefficient of expansion of the cured bond is lowered by selectively varying the proportion of the said substance employed for modifying the resin.

2. An improvement in the method of producing abrasive articles of desired grinding characteristics from a mixture of abrasive grain and resin-containing bond which comprises mixing abrasive grain and resin modified by the addition of pulverized fused quartz and controlling the extent to which the coefficient of expansion of the cured bond is lowered by selectively varying the proportions of the said fused quartz in the bond.

3. An improvement in the method of producing abrasive articles of desired grinding characteristics from a mixture of aluminum oxide abrasive grain and resin-containing bond which comprises mixing the abrasive grain and resin modified by the addition of pulverized silicon carbide and controlling the extent to which the coefficient of expansion of the cured bond is lowered by selectively varying the proportion of the said silicon carbide employed for modifying the resin.

4. An improvement in the method of producing abrasive articles of desired grinding characteristics from a mixture of abrasive grain and resin-containing bond which comprises mixing abrasive grain and resin modified by the addition of a comminuted devitrified silicate of a metal of the second group of the periodic system having a coefficient of expansion less than $5.0 \times 10^{-6}/°$ C. at $20$–$90°$ C. and lower than that of the said abrasive grain and controlling the extent to which the coefficient of expansion of the cured bond is lowered by selectively varying the proportion of the said substance employed for modifying the resin.

5. An improvement in the method of producing abrasive articles of desired grinding characteristics from a mixture of abrasive grain and resin-containing bond which comprises mixing abrasive grain and resin modified by the addition of comminuted devitrified magnesium alumino-silicate and controlling the extent to which the coefficient of expansion of the cured bond is lowered by selectively varying the proportion of the said substance employed for modifying the resin.

6. An abrasive article comprising abrasive grain and a heat hardened resin-containing bond modified by a comminuted substance having a coefficient of expansion less than $5.0 \times 10^{-6}/°$ C. at 20–90° C. and lower than that of the said abrasive grain.

7. An abrasive article comprising abrasive grain and a heat hardened resin-containing bond modified by pulverized fused quartz.

8. An abrasive article comprising abrasive grain and a heat-hardened resin-containing bond modified by a comminuted devitrified silicate of a metal of the second group of the periodic system having a coefficient of expansion less than $5.0 \times 10^{-6}/°$ C. at 20–90° C. and lower than that of the said abrasive grain.

9. An abrasive article comprising aluminum oxide abrasive grain and a heat hardened resin-containing bond modified by pulverized silicon carbide.

10. An abrasive article comprising abrasive grain and a heat hardened resin-containing bond modified by pulverized devitrified magnesium alumino silicate.

11. A resinous bonded abrasive article comprising abrasive grain and a bond containing a synthetic resin with which has been incorporated a modifier having a coefficient of thermal expansion less than $5.0 \times 10^{-6}/°$ C. at 20–90° C. to lower the cofficient of expansion of the bond, said bond having due to the incorporation of said modifier a thermal coefficient of expansion less than seven times that of the said abrasive grain.

RAYMOND C. BENNER.
OSBORNE L. MAHLMAN.
WALTER D. ROSSOW.